US009037956B2

(12) United States Patent
Goldstein et al.

(10) Patent No.: US 9,037,956 B2
(45) Date of Patent: May 19, 2015

(54) CONTENT CUSTOMIZATION

(75) Inventors: Douglas S. Goldstein, Riverdale, NY (US); Ajay Arora, New York, NY (US); Douglas Hwang, New York, NY (US); Guy A. Story, Jr., New York, NY (US); Shirley C. Yang, New York, NY (US)

(73) Assignee: Audible, Inc., Newark, NJ (US)

( * ) Notice: Subject to any disclaimer, the term of this patent is extended or adjusted under 35 U.S.C. 154(b) by 310 days.

(21) Appl. No.: 13/434,538

(22) Filed: Mar. 29, 2012

(65) Prior Publication Data
US 2013/0257871 A1 Oct. 3, 2013

(51) Int. Cl.
G06F 17/27 (2006.01)
G11B 27/034 (2006.01)
G11B 27/32 (2006.01)

(52) U.S. Cl.
CPC ............ G11B 27/034 (2013.01); G11B 27/322 (2013.01)

(58) Field of Classification Search
CPC ....... G06F 17/24; G06F 17/27; G06F 17/243; G06F 17/30386; G06F 17/30893
USPC .................................................. 715/741–744
See application file for complete search history.

(56) References Cited

U.S. PATENT DOCUMENTS

| 3,892,427 | A * | 7/1975 | Kraynak et al. ............. 281/15.1 |
| 5,657,426 | A | 8/1997 | Waters et al. |
| 6,356,922 | B1 | 3/2002 | Schilit et al. |
| 6,544,040 | B1 | 4/2003 | Brelis et al. |
| 6,766,294 | B2 | 7/2004 | MacGinite et al. |
| 6,886,036 | B1 | 4/2005 | Santamaki et al. |
| 6,961,895 | B1 | 11/2005 | Beran et al. |
| 7,107,533 | B2 | 9/2006 | Duncan et al. |
| 7,231,351 | B1 | 6/2007 | Griggs |
| 7,313,513 | B2 * | 12/2007 | Kinder .............................. 704/1 |
| 8,109,765 | B2 | 2/2012 | Beattie et al. |
| 8,131,545 | B1 | 3/2012 | Moreno et al. |

(Continued)

FOREIGN PATENT DOCUMENTS

| NZ | 532174 | 11/2012 |
| WO | WO 2011/144617 | 11/2011 |
| WO | WO 2011/151500 | 12/2011 |

OTHER PUBLICATIONS

Story Jr. et al., U.S. Appl. No. 12/881,021, filed Sep. 13, 2010, entitled "Systems and Methods for Associating Stories with Related Referents".

(Continued)

*Primary Examiner* — David Zarka
*Assistant Examiner* — Richard M Russell
(74) *Attorney, Agent, or Firm* — Knobbe, Martens, Olson & Bear, LLP

(57) ABSTRACT

A content processing service may analyze an item of original content and identify several objects, attributes of those objects, and relationships between those objects present in the item of original content. The content processing service may also analyze a source graph, such as a social graph or supplemental graph, and identify several objects, attributes of those objects, and relationships between those objects present in the source graph. The content processing service may customize the item of original content by selecting an original object and selecting a source graph object. One or more of the attributes or relationships of the selected original object in the item of original content may be replaced by one or more of the attributes or relationships of the selected source graph object, thereby forming an item of modified content.

33 Claims, 9 Drawing Sheets

(56) References Cited

U.S. PATENT DOCUMENTS

| | | | |
|---|---|---|---|
| 8,131,865 | B2 | 3/2012 | Rebaud et al. |
| 8,452,797 | B1 | 5/2013 | Paleja et al. |
| 2002/0002459 | A1 | 1/2002 | Lewis et al. |
| 2002/0007349 | A1 | 1/2002 | Yuen |
| 2002/0116188 | A1 | 8/2002 | Amir et al. |
| 2003/0061028 | A1 | 3/2003 | Dey et al. |
| 2003/0083885 | A1 | 5/2003 | Frimpong-Ansah |
| 2003/0115289 | A1 | 6/2003 | Chinn et al. |
| 2004/0078786 | A1* | 4/2004 | Hoolahan et al. ............. 717/136 |
| 2004/0243403 | A1* | 12/2004 | Matsunaga et al. ........... 704/209 |
| 2004/0261093 | A1 | 12/2004 | Rebaud et al. |
| 2005/0086211 | A1 | 4/2005 | Mayer |
| 2005/0276570 | A1 | 12/2005 | Reed et al. |
| 2006/0112131 | A1* | 5/2006 | Harrold et al. ................ 707/102 |
| 2006/0148569 | A1 | 7/2006 | Beck |
| 2007/0005651 | A1 | 1/2007 | Levien et al. |
| 2007/0016314 | A1 | 1/2007 | Chan et al. |
| 2007/0061487 | A1 | 3/2007 | Moore et al. |
| 2007/0136459 | A1 | 6/2007 | Roche et al. |
| 2008/0039163 | A1* | 2/2008 | Eronen et al. ..................... 463/1 |
| 2008/0177822 | A1 | 7/2008 | Yoneda |
| 2008/0294453 | A1 | 11/2008 | Baird-Smith et al. |
| 2009/0136213 | A1 | 5/2009 | Calisa et al. |
| 2009/0222520 | A1 | 9/2009 | Sloo et al. |
| 2009/0228570 | A1 | 9/2009 | Janik et al. |
| 2009/0233705 | A1 | 9/2009 | Lemay et al. |
| 2009/0282093 | A1 | 11/2009 | Allard et al. |
| 2009/0319273 | A1 | 12/2009 | Mitsui et al. |
| 2010/0042682 | A1 | 2/2010 | Kaye |
| 2010/0064218 | A1 | 3/2010 | Bull et al. |
| 2010/0070575 | A1 | 3/2010 | Bergquist et al. |
| 2010/0286979 | A1 | 11/2010 | Zangvil et al. |
| 2010/0287256 | A1 | 11/2010 | Neilio |
| 2011/0067082 | A1 | 3/2011 | Walker |
| 2011/0087802 | A1 | 4/2011 | Witriol et al. |
| 2011/0119572 | A1 | 5/2011 | Jang et al. |
| 2011/0231474 | A1 | 9/2011 | Locker et al. |
| 2011/0246383 | A1 | 10/2011 | Gibson et al. |
| 2011/0288942 | A1* | 11/2011 | De Wet et al. ............. 705/14.73 |
| 2011/0295843 | A1 | 12/2011 | Ingrassia et al. |
| 2011/0296287 | A1 | 12/2011 | Shahraray et al. |
| 2012/0030288 | A1 | 2/2012 | Burckart et al. |
| 2012/0054813 | A1 | 3/2012 | Carmichael |
| 2012/0144294 | A1* | 6/2012 | Amano et al. ................. 715/255 |
| 2012/0150935 | A1 | 6/2012 | Frick et al. |
| 2012/0158706 | A1 | 6/2012 | Story, Jr. et al. |
| 2012/0166180 | A1 | 6/2012 | Au |
| 2012/0197998 | A1 | 8/2012 | Kessel et al. |
| 2012/0236201 | A1 | 9/2012 | Larsen et al. |
| 2012/0245720 | A1 | 9/2012 | Story, Jr. et al. |
| 2012/0246343 | A1 | 9/2012 | Story, Jr. et al. |
| 2012/0311465 | A1 | 12/2012 | Nealer et al. |
| 2012/0315009 | A1 | 12/2012 | Evans et al. |
| 2013/0090914 | A1 | 4/2013 | White |
| 2013/0103814 | A1 | 4/2013 | Carrasco et al. |
| 2013/0130216 | A1 | 5/2013 | Morton et al. |
| 2013/0151610 | A1 | 6/2013 | Schoen et al. |
| 2013/0268826 | A1 | 10/2013 | Nowakowskit et al. |

OTHER PUBLICATIONS

"Speech Synthesis Markup Language," http://en.wikipedia.org/wiki/Speech_Synthesis_Markup_Language, last modified Feb. 12, 2011, last accessed Mar. 5, 2012.

"Speech Synthesis," http://en.wikipedia.org/wiki/Speech_Synthesis, last modified Feb. 22, 2012, last accessed Mar. 5, 2012.

Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.

Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.

Fabio Vignoli et al., Aug. 7-10, 1999, A Text-Speech Synchronization Technique With Applications to Talking Heads, Auditory-Visual Speech Processing, ISCA Archive.

Yardena Arar, Jan. 7, 2010, Blio E-Book Platform: No Reader (Yet), But Great Graphics.

International Search Report issued for PCT/US12/30198 mailed on Jun. 20, 2012, 16 pages.

U.S. Appl. No. 13/531,376, filed Jun. 22, 2012, entitled "Modelling Expected Errors for Discriminative Training."

U.S. Appl. No. 13/536,711, filed Jun. 28, 2012, entitled "Pacing Content."

U.S. Appl. No. 13/604,482, filed Sep. 5, 2012, entitled "Identifying Corresponding Regions of Content."

U.S. Appl. No. 13/604,486, filed Sep. 5, 2012, entitled "Selecting Content Portions for Alignment."

U.S. Appl. No. 13/662,306, filed Oct. 26, 2012, entitled "Content Presentation Analysis."

Beattie, Valerie et al., "Reading Assistant: Technology for Guided Oral Reading", Scientific Learning, Apr. 10, 2012, 5 pages.

International Search Report re International Application No. PCT/US13/33935 mailed on Jul. 3, 2013.

Levinson, S.E. et al., "Continuous Speech Recognition from a Phonetic Transcription", Acoustics, Speech, and Signal Processing, Apr. 1990, pp. 190-199.

* cited by examiner

CONTENT CUSTOMIZATION

BACKGROUND

Many forms of digital content contain text and/or audio content. For example, electronic books, audiobooks, audiobook scripts, music, movies, and computer games may all contain text or audio content. The audio content included in these forms of digital content may include narration describing various aspects of the digital content. For example, the narration may describe people, characters, locations, settings, objects, attributes, and relationships, among other aspects of the digital content.

In some instances, a user may wish to modify the digital content to suit his or her interests. For example, the user may wish to personalize the digital content in some way for himself or herself, or as a gift to a friend. Unfortunately, personalizing audio content and other forms of digital content can be a challenging and time-consuming task. For example, if a user wanted to become the main character in an audiobook, a narrator might have to re-record large portions of the narration or even the entire narration for that audiobook. The narrator might have to change all references to the main character's name to the user's name, for instance. If the user wants further personalization, such as adding his or her friends as characters, the narrator would have to re-record the narration to include references to those friends as well. The narrator would then have to repeat the task of re-recording to customize an audiobook for a different user with a different name or different friends.

Additionally, if the user is unhappy with the customization or wants to make changes to the customization, the narrator might have to re-record some or all of the narration. For example, a user may be unhappy about the selection of characters played by his or her friends. Because there are many ways to map a plurality of characters to a user's friends, this process can be expensive and inefficient. These problems and others are not merely limited to audiobook content.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
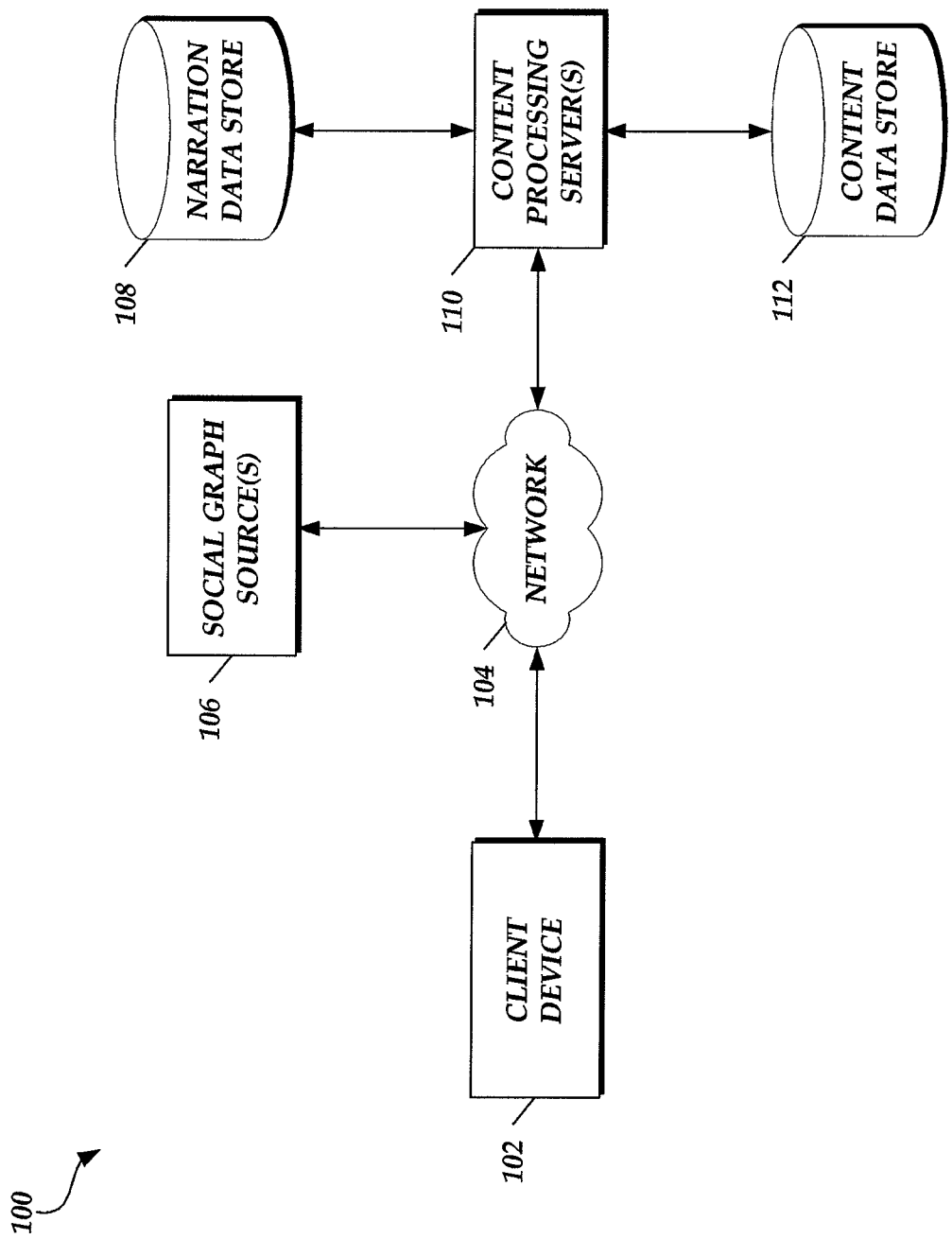
FIG. 1 is a block diagram of an illustrative network environment for processing an item of content.

Generally described, aspects of the present disclosure relate to a computer-implemented content processing service that facilitates the modification and customization of items of original content, such as a book, play, story, etc. For example, the original content may be modified by replacing character names in an item of original content with the names of an individual and the individual's friends and/or family. Accordingly, in one embodiment, the content processing service automatically replaces the character names in the item of original content with the names of the individual and individual's friends/family as found in a social graph affiliated with the individual and maintained by a social networking service.

Those skilled in the art will appreciate that many different types of digital content can be modified by the content processing service. The content processing service can modify virtually any type of digital content, regardless of whether the content includes text, audio, video or multi-media content. For example, the content processing service may modify electronic books, audiobooks, textual documents, music, computer games, movies, etc. The content processing service may also modify or customize the content based at least in part on, for example, an individual's social graph. In other embodiments, the content processing service may modify the content based on other aspects of the content and/or the individual.

In various embodiments, the content processing service uses one or more graphs to determine how to modify the content. Generally described, these graphs include objects, which may have attributes, and relationships between those objects. The content processing service may first identify objects, relationships, and attributes that make up an item of content. These objects, attributes, and relationships in the item of content may be thought of as a "target" graph. The content processing service may then substitute into the target graph other objects, relationships, and attributes from one or more "source" graphs, using some mapping of objects, relationships, and attributes in the source graph with the objects, relationships, and attributes in the target graph.

One example of a source graph that may be used is the social graph of an individual. The social graph of an individual may plot the structure of the relationships an individual has with one or more other entities, herein referred to as social graph objects. Social graph objects, as well as objects more generally, may be organized into classes. Classes of social graph objects may include persons, places, things, and events. A number of example social graph objects in the above classes are described below. These examples are offered as illustrations and do not limit the types of objects that may appear in these example classes.

Persons appearing in the individual's social graph may include the friends, family members, and colleagues of the individual, as well as the individual himself or herself. Persons appearing in the individual's social graph could also include the individual's favorite celebrities, athletes, performers, musicians, role models, authors, artists, and actors, etc. Organization objects may include teams, bands, clubs, professional groups, and the like. Places may include educational institutions, stadiums, buildings, landmarks, cities, states, countries, bars, offices, museums, and restaurants, just to name a few. Things could include plants, animals, modes of transportation, organizations, teams, clothing, hobbies, sports, musical instruments, books, ideas, philosophies, tools, and weapons, among other examples. Events could include concerts, sporting events, holidays, birthdays, anniversaries, current events, trends, etc.

Additionally, a social graph object may be associated with one or more attributes. Those skilled in the art will recognize that an attribute may include words, phrases, sentences, images, portions of images, audio clips, video clips, and the like that describe or related to an object in some way. For example, the attributes of a person may include his or her name, nickname, gender, age, height, weight, birthday, nationality, hair color, eye color, or profession, among other attributes. The attributes of a place may include the name of the place, its geographical location, its address, whether it is a building or outdoors, the function of the location, etc. The attributes of an event may include the name, date, and time of the event, as well as conditions related to the event, such as weather, economic, political, historical, or cultural conditions. Attributes of thing objects could include the thing's name, quantity, material, color, size, and shape, among other attributes.

The individual's social graph may also plot the structure of the relationships between one or more social graph objects. For example, two persons may have a relationship, such as best friends, siblings, parent and child, etc. Different classes of objects may be related as well. For example, a person may have a relationship with a place, such as the person's hometown, or a favorite restaurant or club. Relationships may include any number of objects as well. For example, several baseball players may have teammate relationships with each other; an employer relationship with the team for which they play; and a hometown relationship with the city in which their team plays.

Thus, in embodiments where one or more of an individual's social graphs serve as source graphs, the content processing service identifies social graph objects, attributes, and relationships from the social graphs affiliated with the individual. These social graphs may be associated with an account maintained by the individual at an electronic network-based social networking service or other network-based service. In some embodiments, the individual may allow or instruct the content processing service to access a social graph associated with one or more of the individual's accounts. The content processing service may ask the individual's permission before accessing the social graph or graphs. In other embodiments, the individual may allow a social networking service or other social graph source to send (or otherwise make available) his or her social graph directly to the content processing service. Those skilled in the art will also appreciate that one or more social graphs belonging to the same individual or to different individuals may be used as source graphs.

Like a social graph, an item of original content may contain one or more original objects, original attributes, and original relationships, each representing a discrete portion of the content, such as one or more words of text, or one or more sentences of text, one or more frames of video, one or more clips of audio, etc. As with social graph objects, original objects may be persons, such as characters that appear in the content; places, such as locations or settings that appear in the content; events, such as those occurring during the plot of the content; or things, such as those that appear in the content. As with a social graph, these original objects may have one or more attributes describing each object. Additionally, objects in an item of original content may have relationships between one another. Two characters may be siblings, best friends, or enemies, for example.

The objects, attributes, and relationships that form an item of original content may be identified by the content processing service in a variety of ways. In some embodiments, the content processing service may employ natural language techniques, regular expression techniques, content parsing techniques, semantic analysis techniques, syntactic analysis techniques, named entity extraction, or other forms of content analysis in order to identify the objects, attributes, and relationships in an item of original content. These objects, attributes, and relationships may be organized into a target graph as described above. In other embodiments, a publisher of an item of original content may provide the content processing service with a target graph or a simple list of the objects, attributes, and relationships in the item of original content. In still other embodiments, the content processing service may obtain a target graph or list of the objects, attributes, and relationships in the item of original content from a network-based encyclopedia or knowledge base. In one embodiment, the content processing service identifies objects, attributes and relationships based on data obtained from a network-based, social knowledge base that includes an electronic catalog of books to which multiple users contribute book titles, reviews, ratings, plot/character information, recommendations, tags, etc. The content processing service may identify the objects, attributes, and relationships in other ways as well.

As discussed above, the content processing service may access, generate, extract, or otherwise identify a target graph or list of one or more objects, attributes, and/or relationships related to an item of original content. As also discussed above, the content processing service may access, generate, extract, or otherwise identify a list of several social graph objects, attributes, and/or relationships related to a social graph. Thus, in one embodiment, the content processing service forms an item of modified content by selecting an original object from the item of original content, selecting a social graph object from a social graph, and replacing one, some, or all of the attributes of the selected original object with one, some, or all of the attributes of the selected social graph object.

In some embodiments, the content processing service may select which social graph objects replace which original objects by analyzing relationships between social graph objects in the source graph and relationships between original objects in the target graph. In some embodiments, the content processing service looks for a relationship between two original objects that is the same as the relationship between two social graph objects. For example, say the main character in an item of original content has a brother character. Furthermore, say that an individual's social graph indicates that the individual, like the main character, has a brother. Accordingly, the content processing service may replace the original main character object and its attributes with the individual and his or her attributes, and may replace the original brother object and its attributes with the individual's brother and his attributes. The relationships between two original objects and two social graph objects need not be identical. Accordingly, in other embodiments, the content processing service may look for a relationship between two original objects that is not the same as the relationship between two social graph objects. Returning to the previous example, the main character may have a sister instead of a brother. The content processing service may nonetheless replace the main character object and its attributes with the individual and his or her attributes, and the sister character object and her attributes with the individual's brother and his attributes. The content processing service may further identify the original relationship in the item of original content (here, sister) and replace it with the social graph relationship (here, brother).

In some embodiments, the content processing service replaces one or more original objects and their attributes with one or more supplemental objects and their attributes. Supplemental objects include persons, places, things, or events that may not necessarily be part the item of original content. Supplemental objects may be grouped together as part of a supplemental graph, which may further include a number of supplemental relationships between the supplemental objects. Thus, in some embodiments, a supplemental graph is used as a source graph by the content processing service. Supplemental graphs may be provided by any of a variety of sources. In one embodiment, the content processing service maintains one or more supplemental graphs. In another embodiment, the content processing service accesses one or more supplemental graphs from a network-based encyclopedia, a network-based knowledge base, or another network-based source. In still another embodiment, the content processing service may allow a sponsor to provide a supplemental graph, for example, to advertise products (e.g., by replacing all beverage objects and attributes in the item of original content with the objects and attributes corresponding to the sponsor's brand of soda). In yet a further embodiment, the content processing service is provided with a supplemental graph by a user, for example, the person for whom the content is to be modified. In some embodiments, a supplemental graph may include a social graph, which may include one or more social graph objects, attributes, and relationships, as described above. In one embodiment, the social graph is affiliated with the individual for whom the item of original content is to be modified. In another embodiment, the social graph is affiliated with a friend of the individual for whom the item of original content is to be modified.

One example of a supplemental graph is the supplemental graph of a setting, such as a city. An example of a supplemental graph for the city of Chicago will be illustrative. The supplemental graph of Chicago may include has several place objects, such as the Sears Tower (also known as the Willis Tower) and the Navy Pier. The supplemental graph of Chicago may include several event objects, such as the St. Patrick's Day Parade and Casimir Pulaski Day. If an individual has Chicago in his or her social graph (for example, as a place object corresponding to the individual's hometown), the content processing service may replace a place object corresponding to a city in the item of original content with the social graph object Chicago, and replace an event object with the St. Patrick's Day Parade, a supplemental event object.

A supplemental graph could also represent a theme, such as a science fiction theme. Supplemental objects for this science fiction theme could include various planets as place objects; spaceships as modes of transportation; space aliens as person objects; spaceship battles as event objects, and so forth. By accessing a supplemental graph, the content processing service could yet further personalize an item of original content by replacing some original attributes with social graph attributes (e.g., by replacing the main character's name with the name of a person for whom the content is to be modified) and by replacing some original attributes with supplemental attributes (e.g., by changing the content's original Wild West theme, which includes stagecoaches as a mode of transportation and revolvers as weapons, to a science fiction theme, which includes spaceships as a mode of transportation and laser guns as weapons).

For an item of original content that includes narration, such as an audiobook, the content processing service may modify the narration as well. Those skilled in the art will appreciate that narration may include, for example, words, phrases, or sentences, and that narration may be spoken, sung, shouted, and the like by speakers such as a narrator, commentator, or character. Narration may also include words, phrases, or sentences such as dialogue spoken by characters in the item of original content. The narration may include a portion in which an attribute (original, social graph, or supplemental) or relationship (original, social graph, or supplemental) is recited, displayed, or otherwise presented to a user of the content. In one embodiment, the content processing service identifies a recitation of an original attribute of the selected original object, and replaces that recitation with a recitation of a social graph attribute of the selected social graph object. In another embodiment, the content processing service identifies a recitation of an original attribute of another original object, and replaces that recitation with a recitation of a supplemental attribute of a supplemental object.

In some embodiments, a recitation of an attribute (such as a social graph attribute or a supplemental attribute) may be constructed from a narrator voice library, in which various audio clips of various phonemes, words, names, phrases, etc. are maintained for retrieval and use. The user may provide one or more audio clips to the voice library as well. These audio clips may be of his or her own voice or of the voice of any other individual. In embodiments, the recitation is generated from an underlying text of an audiobook or script using a text-to-speech generator. In still further embodiments, the recitation is obtained from the original narrator or another narrator and then used to replace the original attribute(s).

In some embodiments, the content processing service selects a person from a source graph (such as an individual's social graph or a supplemental graph) to replace a character in an item of original content. Accordingly, one or more recitations spoken in the voice of the character in the item of original content may be replaced with one or more recitations spoken in the voice of a selected person from either the individual's social graph or a supplemental graph. In one embodiment, the content processing service requests from the selected person a voice sample or one or more audio clips in the selected person's voice, which may be stored in a voice library. Based on these clips, recitations may be constructed or synthesized. In another embodiment, the content processing service may synthesize recitations in the selected person's voice from audio clips stored in a voice library. In yet another embodiment, the content processing service requests that the selected person speak the recitations that will replace the recitations spoken in the voice of the character in the item of original content, and may store these recitations in a voice library.

In some embodiments, the content processing service may accept input regarding the selection of original objects, original attributes, social graph objects, social graph attributes, supplemental objects, and supplemental attributes, among other target and source graph objects and attributes. For example, the item of original content may include persons corresponding to a main character and a sidekick. In such cases, a user may specify which persons from his or her social graph will replace which persons in the item of original content. For example, the user may select him or herself to replace the main character object, and may select his or her best friend to replace the sidekick.

In some embodiments, the content processing service may store one or more user profiles for selecting original objects and selecting source graph objects with which to replace the original objects. Returning to the above example, the user may specify that his or her best friend always plays the sidekick. In one embodiment, the content processing service receives these preferences and applies them to each subsequent item of content that it processes. Accordingly, for all subsequently processed items of original content that include persons corresponding to a main character and sidekick, the content processing service would replace the main character with the user and the sidekick with the user's best friend. In another embodiment, the content processing service applies these preferences across one or more related items of content, such as items of content in a series. In a further embodiment, the user associated with the user profile may allow one or more other users of the content processing service to access his or her stored profile for use in forming an item of modified content.

In some embodiments, a rights-holder (e.g., a copyright holder) of the item of original content specifies which original objects and attributes can and cannot be replaced with source graph objects and attributes. For example, the rights-holder to an item of original content set in New York City may specify that any item of modified content must also be set in New York City. In this example, only source graph places from New York City could replace original places in the item of original content. Thus, replacing the original place "Yankees Stadium" with a source graph place such as "Shea Stadium" or "Madison Square Garden" would be permissible, as Yankees Stadium, Shea Stadium, and Madison Square Garden are all in New York City. However, replacing the original place "Yankees Stadium" with the source graph place "Fenway Park" would be an impermissible replacement, as Fenway Park is in Boston, not New York City.

In some embodiments, the content processing service dynamically updates the item of modified content. In one embodiment, these updates are performed automatically by the content processing service. In another embodiment, the content processing service only performs these updates at the request of a user.

As an example of dynamic updates, the content processing service may analyze how an individual's social graph changes over time and choose new social graph objects or supplemental objects. For example, at a first time, an individual's social graph may have New York City as a hometown. Thus, the content processing service might modify an item of original content to include place objects such the Empire State Building, a New York City landmark. The individual may then move to Chicago. The content processing service may recognize that the individual's social graph has changed to include Chicago as a hometown. Accordingly, the content processing service might replace the Empire State Building with the Sears Tower, a landmark in Chicago. Other dynamic updates may include changes as to which persons from an individual's social graph replace which characters in the item of original content.

As another example, the content processing service dynamically may update the item of modified content based on changes in a supplemental graph. The item of original content may include an original object corresponding to a team that is in first place in a sports league. At a first time, a team called the Rhinos may be in first place in the sports league. Thus, the Rhinos would replace the original team object. As the sports league's season progresses, another team called the Giraffes may move into first place in the sports league. Thus, the item of modified content may be updated so that the Giraffes replace the original team object, either automatically by the content processing service or at the request of the user.

In some embodiments, part or all of the item of modified content may be "frozen" or "locked in" to prevent dynamic updates. The user or the content processing service may select which portions of the item of modified content are to be frozen. In one embodiment, the entire item of modified content is frozen when it is presented to a user for the first time. In another embodiment, individual objects, attributes, or relationships may be frozen. Returning to the above example, the item of original content may include an original object corresponding to a team that is first place in a sports league. At the time the item of modified content is presented to the user for the first time, a team called the Rhinos may be in first place in the sports league. Thus, the Rhinos would replace the original team object. As the sports league's season progresses, another team called the Giraffes may move into first place in the sports league. However, because the selection of the team object was frozen when the Rhinos were in first place, the content processing service would not update the item of modified content to replace the original team object with the Giraffes. Rather, the original team object would continue to be replaced by the Rhinos.

In some embodiments, the content processing service analyzes the item of modified content before presenting it to the individual for whom the content is to be modified. For example, the content processing service may perform one or more quality control checks prior to presentation. In some embodiments, the quality control is performed by machine analysis. In other embodiments, the quality control is performed by a human. In still other embodiments, more than one quality control check is performed, such as combining machine analysis with human analysis.

The content processing service may present all or a portion of the item of modified content to the individual for whom the content is to be modified. For example, if the item of original content is an electronic book, a portion of the modified text may be displayed. Likewise, if the item of original content is an audiobook, a portion of narration may be played. If the user of the content processing service is satisfied with the item of modified content, he or she may purchase and/or otherwise proceed with consumption of the item of modified content. If the purchaser or consumer desires further changes to the item of modified content, he or she may notify the content processing service that he or she desires further changes. In some embodiments, the purchaser or consumer may specify these further changes, such as changing a narrator's or character's voice, or changing which original objects are selected and which original attributes are replaced, or changing which source graph objects (such as social graph objects or supplemental objects) are selected and which source graph attributes (such as social graph attributes or supplemental attributes) appear in the item of modified content.

It should be appreciated that the content processing service may be embodied in several environments. In some embodiments, the content processing service is provided as an electronic network-based service. Accordingly, the content processing service may be accessed by a client device over an electronic network. In other embodiments, the content processing service is embodied as a physical location, such as an in-store kiosk, that may be able to communicate over an electronic network. In still other embodiments, the content processing service is itself embodied in a single device.

Network Environment

FIG. 1 depicts an illustrative embodiment of a network environment 100 in which an embodiment of the content processing service may operate. The network environment 100 may include one or more client devices 102, a network 104, one or more social graph sources 106, a narration data store 108, one or more content processing servers 110, and a content data store 112.

The client device 102 may be any computing device capable of communicating over the network 104, such as a laptop or tablet computer, personal computer, personal digital assistant (PDA), hybrid PDA/mobile phone, mobile phone, electronic book reader, set-top box, camera, audiobook player, digital media player, video game console, in-store kiosk, or the like. Those skilled in the art will appreciate that the network 104 may be any wired network, wireless network or combination thereof. In addition, the network 104 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The client device 102 may perform a variety of functions in interfacing with one or more content processing servers 110 hosting the content processing service. In some embodiments, the client device 102 may transmit, to the content processing server 110, requests for an item of modified content over the network 104, and may receive, from the content processing server 110, an item of modified content over the network 104. In some embodiments, the client device may display or play all or portions of items of modified content, such as modified text or modified narration. These portions of items of modified content may be presented to the user through a user interface generated by the content processing server 110. In some embodiments, the client device 102 transmits, to the content processing server 110 requests for changes to the item of original content or to the item of modified content.

One or more social graph sources 106 may also be connected to and able to communicate over the network 104. These social graph sources may be embodied in one or more network-based services hosted by one or more servers. Examples of social graph sources include, but are not limited to, network-based social networking services; network-based social geographical services; network-based journaling or web-logging ("blogging") communities; network-based micro-blogging communities, wherein users may post short journals or "tweets"; network-based reviewing communities, such as those that review restaurants or bars; network-based travel services; network-based content hosting communities; network-based content delivery platforms; network-based genealogical services; digital family trees; lists of contacts maintained by a telecommunications service; lists of contacts maintained by an electronic mail service; lists of contacts maintained by an instant messaging service; lists of contacts maintained by a bulletin board service; and Global Positioning System (GPS) data, among other possible sources. It should be appreciated that in some embodiments, the client device 102 may include a social graph source, and/or store social graph data, as well. For example, the client device 102 may store a social graph that is created from user input.

The content processing service may be embodied in one or more content processing servers 110. The one or more content processing servers 110 may also be connected to and able to communicate over the network 104. The content processing server 110 may be able to access one or more social graph sources 106 over the network 104 in order to gather social graph objects, attributes, and relationships from the one or more social graph sources 106. In some embodiments, the content processing server 110 may scrape, from a content page (or "Web page") hosted by the one or more social graph sources 106, an individual's social graph. In other embodiments, the user of the client device 102 may communicate over the network 104 with the one or more social graph sources 106 and direct the one or more social graph sources 106 to send (or otherwise provide access to) one or more of the user's social graphs over the network to the one or more content processing servers 110.

The one or more content processing servers 110 may also be able to communicate over the network 104 with the client device 102. Accordingly, the one or more content processing servers 110 may receive requests to modify one or more items of original content from the client device 102; present or transmit portions of or entire items of modified content to the client device 102; receive user input generated at client device 102; or receive requests from the client device 102 to perform further modifications on one or more items of modified content.

The one or more content processing servers 110 may also be in communication with one or more narration data stores 108. The narration data store 108 may store one or more audio files associated with one or more items of original content. For example, an audio file may include a narrated version or narration of an item of original content, such as an audiobook.

In some embodiments, the narration data store 108 may also store or have access to one or more narrator voice libraries. Narrator voice libraries may include audio files including one or more clips spoken by one or more narrators or characters in an item of original content. An audio clip may include, for example, individual phonemes or syllables, words, phrases, or sentences. In some embodiments, a set of audio clips spoken by a narrator or character may include enough audio clips that a speech synthesis program can construct a recitation or narration of any desired syllable, word, phrase, sentence, etc. in the narrator's or character's voice. Such speech synthesis programs are known in the art and will not be described in further detail here.

The narration data store 108 may be embodied in hard disk drives, solid state memories, and/or any other type of computer storage. The narration data store 108 may be distributed or partitioned across multiple storage devices as is known in the art without departing from the spirit and scope of the present disclosure. Moreover, while the narration data store 108 is depicted in FIG. 1 as being local to the one or more content processing servers 110, those skilled in the art will appreciate that the narration data store 108 may be remote to the one or more content processing servers 110 and/or may be a network-based service itself.

The one or more content processing servers 110 may also be in communication with one or more content data stores 112. In some embodiments, the content data store 112 may store items of original content and items of modified content. As discussed above, items of original content may include digital content such as electronic books, audiobooks, audiobook scripts, music, movies, and computer games. It should be appreciated that the content data store 112 can also store audio files associated with items of original content or modified content as desired. For example, the content data store 112 may store one or more audio files associated with an item of original content, such as an audiobook.

In some embodiments, the content data store 112 may also store lists of original objects, original attributes, and original relationships for one or more items of original content. In other embodiments, the content data store 112 may also store supplemental objects and supplemental attributes. In still other embodiments, the content data store 112 may store supplemental graphs as well. In yet further embodiments, the content data store 112 may also store one or more user profiles; one or more rights-holder profiles; or one or more social graphs.

The content data store 112 may be embodied in hard disk drives, solid state memories, and/or any other type of computer storage. The content data store 112 may be distributed or partitioned across multiple storage devices as is known in the art without departing from the spirit and scope of the present disclosure. Moreover, while the content data store 112 is depicted in FIG. 1 as being local to the one or more content processing servers 110, those skilled in the art will appreciate that the content data store 112 may be remote to the one or more content processing servers 110 and/or may be a network-based service itself.

Those skilled in the art will also appreciate that while the narration data store 108 and the content data store 112 are depicted in FIG. 1 as distinct data stores, they may be integrated into one combined data store. Those skilled in the art will further appreciate that the narration data store 108 and the content data store 112 may be integrated into the one or more content processing servers 110, or even into the client device 102.

Content Processing Server and Service

Figure 2:
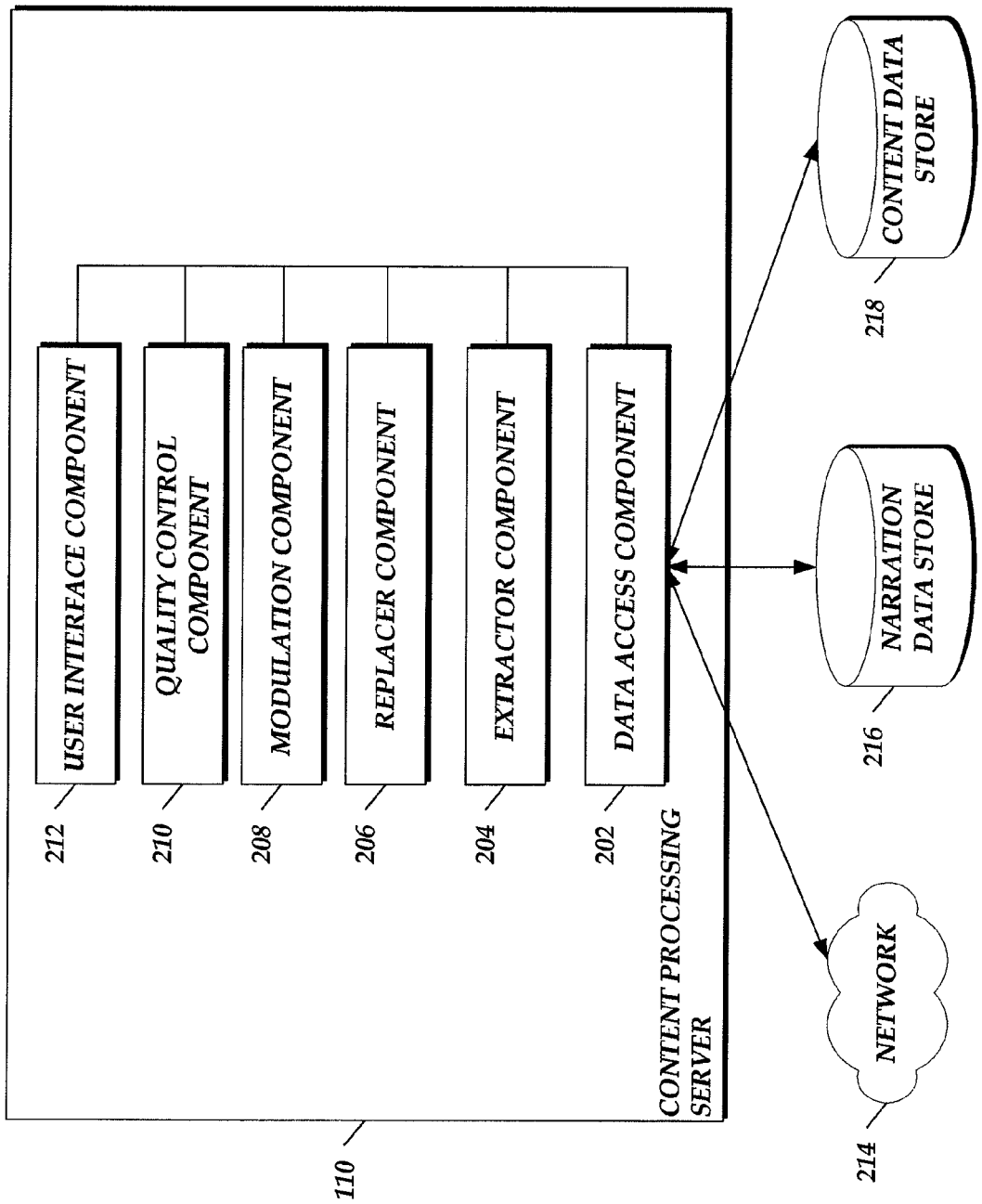
FIG. 2 is a block diagram depicting illustrative components of a content processing server as shown in FIG. 1 and how those components may interact with the network environment.
Figure 3:
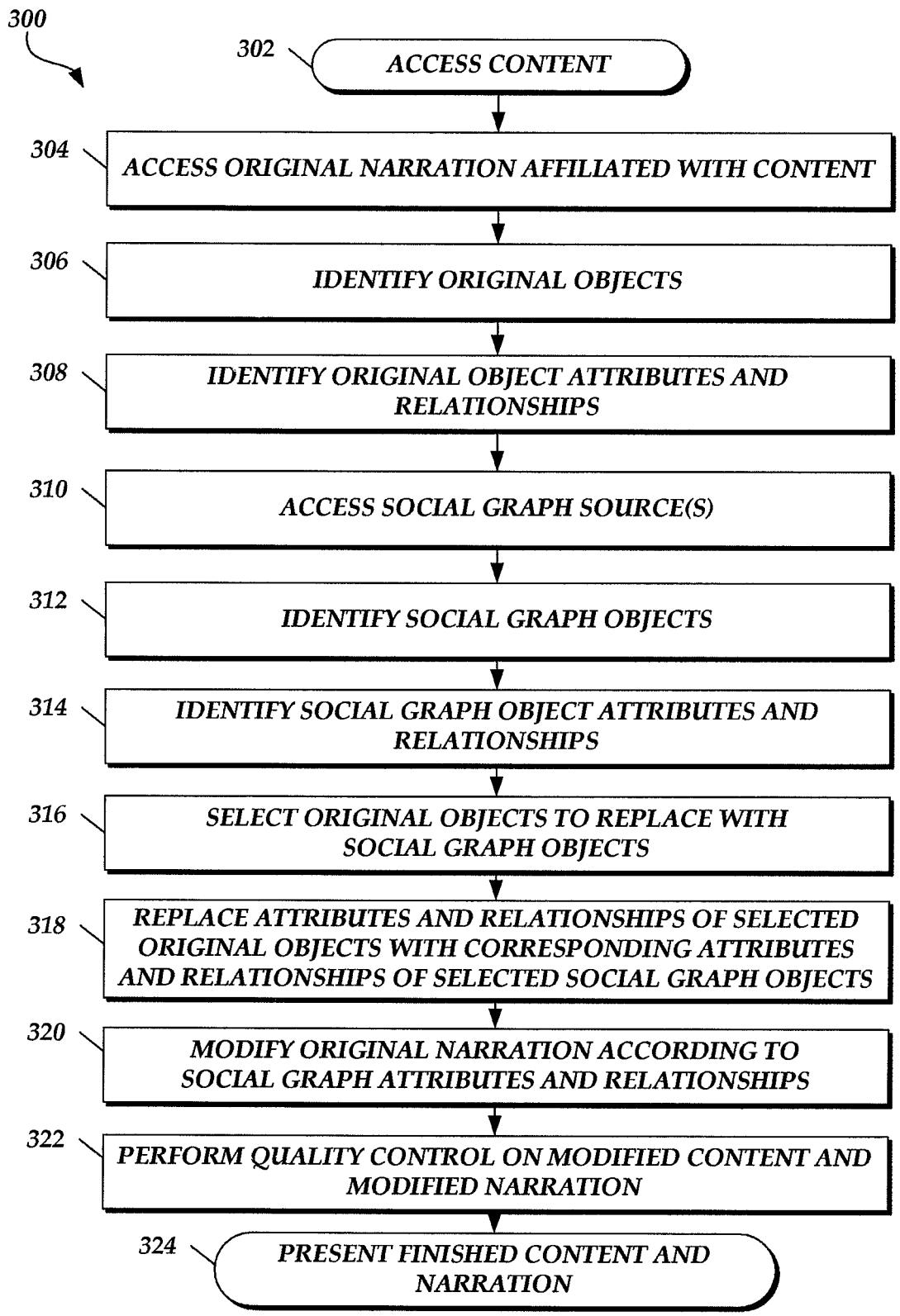
FIG. 3 is a flowchart depicting an illustrative process for generating an item of modified content using a social graph.

FIG. 2 is a block diagram depicting several illustrative components of an embodiment of a content processing server 110 as shown in FIG. 1 and as generally described above. FIG. 3 depicts an illustrative process 300 implemented by the content processing service to customize an item of original content in order to generate an item of modified content using a social graph. To illustrate the role each component plays in the illustrative process 300, FIG. 2 and FIG. 3 are discussed together.

The data access component 202 includes a network interface for accessing the narration data store 108 and the content data store 112. The data access component 202 can access one or more items of original content from content data store 112, as in block 302. The data access component can also access one or more items of modified content; one or more supplemental objects, attributes, or graphs; one or more user profiles; or one or more rights-holder profiles from content data store 112. The data access component 202 can also access one or more audio files from narration data store 108, as in block 304. The data access component 202 is further operative to make the data that it accesses available to other components of the content processing server 110. These components may then perform various operations on the accessed data, discussed below.

The extractor component 204 identifies objects, attributes, and relationships in data made available through the data access component 202. As the data access component 202 accesses an item of original content from the content data store 112, the extractor component 204 identifies original objects in block 306. The extractor component 204 also identifies the attributes and relationships of these original objects in block 308.

In some embodiments, objects, attributes, and relationships in an item of original content may be identified and grouped into a target graph by the extractor component 204 using natural language techniques, regular expression techniques, content parsing techniques, semantic analysis techniques, syntactic analysis techniques, named entity extraction, or other forms of content analysis known in the art. In other embodiments, objects, attributes, and relationships in an item of content may be identified using web scraping techniques for text, images, or multimedia data also known in the art. In still other embodiments, objects, attributes, and relationships in an item of content may be identified by using a list provided by the author or publisher of the item of original content and stored in the content data store 112. In yet further embodiments, the objects, attributes, and relationships in an item of original content may be identified using a list maintained by a network-based encyclopedia or knowledge base and accessed by the data access component 202 of the content processing server 110. Those skilled in the art will appreciate that more than one technique may be employed by the extractor component 204. Other ways to identify original objects, attributes, and relationships in an item of original content are also possible.

The extractor component 204 may also identify one or more recitations in the audio file narration of the attributes and relationships of original objects. In some embodiments, this identification is performed using voice or audio analysis techniques known in the art. These techniques may be used in conjunction with other extracting techniques, as described above. The analysis of narration is discussed further with respect to FIG. 6.

In block 310, a social graph is accessed. The data access component 202 may access a social graph in a variety of ways. In some embodiments, the data access component 202 includes a network interface for accessing and communicating across the network 104. Thus, the content processing server 110 can access a social graph from a social graph source 106 or from a client device 102. In other embodiments, the user may direct a social graph source 106 to send (or otherwise provide access to) a social graph directly to the content processing server 110 via the network 104. In still other embodiments, the data access component 202 may access a social graph from the content data store 112. Those skilled in the art will appreciate that other types of source graphs, such as supplemental graphs, may be accessed.

The extractor component 204 also analyzes the social graph. The extractor component 204 may use natural language techniques, regular expression techniques, content parsing techniques, semantic analysis techniques, syntactic analysis techniques, web scraping (for text, images, multimedia data, hyperlinks, etc.), named entity extraction, or other content or graph analysis techniques known in the art to identify the objects in the social graph in block 312. The extractor component 204 may use these same techniques to identify the attributes and relationships of the social graph objects in block 314. Other ways to identify social graph objects in a social graph are also possible, of course. Those skilled in the art will recognize that other types of source graphs, such as supplemental graphs, may be analyzed as well.

The replacer component 206 then selects objects in the item original content whose attributes and/or relationships are to be replaced. The replacer component 206 also selects a social graph object whose attributes and/or relationships will replace the original attributes and/or relationships. The replacer component 206 may optionally select a supplemental object whose attributes and/or relationships will replace the original attributes and/or relationships. These selections take place in block 316.

In some embodiments, the original object is selected because of a relationship it has with another original object, and the source graph object is selected because of a relationship it has with another source graph object. The source graph object may have a relationship with the other source graph object that is similar or identical to the relationship between the selected original object and the other original object.

In other embodiments, the replacer component 206 may select which original objects, attributes, and relationships to replace in the item of original content based at least in part on user input received through data access component 202. In still other embodiments, the replacer component 206 may access, through data access component 202, a user profile or a rights-holder profile stored in content data store 112, and may select which original objects, attributes, and relationships to replace in the item of original content accordingly. User input, user profiles, or rights-holder profiles may also be used to control which social graph objects, attributes, and relationships (or supplemental objects, attributes, and relationships) the replacer component 206 chooses to replace original objects, attributes, or relationships.

The type of replacement made by the replacer component 206 depends on the type of item of original content. For a text item of original content, the replacer component may replace a word corresponding to an attribute of an original object with a word corresponding to an attribute of the selected social graph object. For example, say that the selected original object is a person who has the name attribute (is named) Kevin, and the selected social graph is a person who has the name attribute (is named) Will. Accordingly, the replacer component 206 would replace the word "Kevin" in a text portion of the item of original content with the name "Will." In other embodiments, the replacer component 206 may modify or replace images, audio clips, or video clips in addition to or instead of making textual replacements.

In some embodiments, the replacer component 206 may replace recitations in a narration of the item of original content, as shown in block 320. A recitation may be replaced if it recites an original attribute or relationship that has been replaced in the item of original content. As discussed above, the extractor component 204 may identify, in an audio file including the narration of an item of original content, recitations of one or more original attributes or relationships of an original object using voice analysis techniques known in the art. The replacer component 206 may then replace a recitation of one or more original attributes or relationships of an original object with a recitation of one or more attributes or relationships of a source graph object, such as a social graph object or a supplemental object. An example will help illustrate this concept. Say that the text in the above example is the text portion of an audiobook that includes audio narration, which may include words or phrases spoken by narrator or dialogue spoken by one or more characters in the item of original content. The replacer component 206 has replaced the name "Kevin" with the name "Will" in the text of the audiobook. If the narrator or a character recited "Kevin" in the original narration, the replacer component 206 would modify the narration so that the narrator or character would recite "Will" instead. In some embodiments, the recitation that replaces the original recitation is constructed or synthesized from one or more audio clips stored in narrator data store 108 using voice synthesis techniques known in the art. In other embodiments, the recitation may be pulled directly from a narration voice library, without the need to construct a new recitation. The modified recitations may be modulated by modulation component 208, as discussed below with respect to FIG. 6.

The content processing server 110 may also include a quality control component 210 to perform the quality control step in block 322. The quality control component may analyze the item of modified content and/or the modified narration generated by the replacer component 206 and the modulation component 208. An illustrative process for providing such quality control is shown in and discussed with respect to FIG. 7.

The content processing server 110 may also include a user interface component 212. The user interface component may generate one or more user interfaces for displaying or otherwise presenting all or a portion of an item of modified content, as in block 324. The user interfaces may be communicated to a client device, such as client device 102. An illustrative process generating such user interfaces is shown in and discussed with respect to FIG. 8. In addition, an illustrative user interface that may be presented on the client device 102 is shown in and discussed with respect to FIG. 9.

Figure 4:
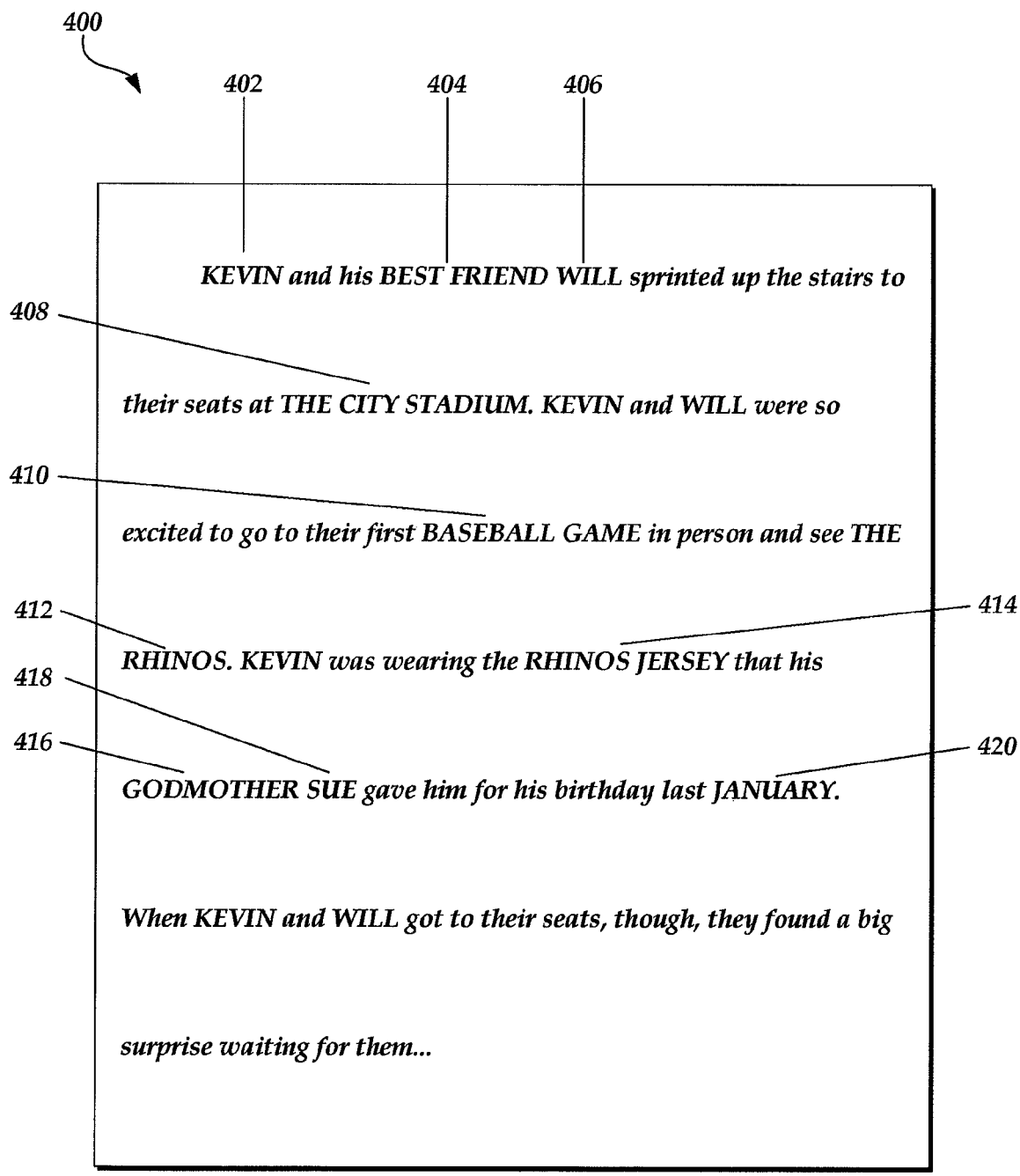
FIG. 4 is a pictorial diagram of an illustrative item of original content.

Illustrations of an item of original content and an item of modified content are provided to help explain the operation of the content processing service described above. FIG. 4 is a pictorial diagram of an illustrative item of original content 400. It contains several original objects, attributes, and relationships in textual form corresponding to an audiobook script that may be displayed concurrently with a narrator's recitations of the portion of the script displayed.

The extractor component 204 of the content processing service identifies several objects, attributes, and relationships in the text of the item of original content and may organize them into a target graph. These objects, attributes, and relationships are capitalized in this illustration, but will not necessarily be capitalized in the item of original content. For ease of reference, these objects and their name attributes are described in the following table:

| Ref. No. | Object | Original Name Attribute |
| --- | --- | --- |
| 402 | Person | Kevin |
| 406 | Person | Will |
| 408 | Place | The City Stadium |
| 410 | Event | Baseball Game |
| 412 | Organization | The Rhinos |
| 414 | Clothing | Rhinos Jersey |
| 418 | Person | Sue |

Object 402 has another attribute in this example: a birthday month attribute 420, here, the month of January.

These objects also have relationships that appear in the text of the audiobook script. The relationships between the objects in this example are described in the following table:

| Ref. No. | 1st Object Ref. No. | 2nd Object Ref. No. | Relationship |
| --- | --- | --- | --- |
| 404 | 402 (Person, Kevin) | 406 (Person, Will) | Best Friend |
| 416 | 418 (Person, Sue) | 402 (Person, Kevin) | Godmother |

It should also be noted that not all relationships may be explicitly obvious in the item of original content 400. Here, some of the relationships that are not explicitly obvious in the item of original content 400 include a "favorite team" relationship between the person 402 and the team 412; a "venue" relationship between the place 408 and the team 412; and an "appropriate attire" relationship between the event 410, the organization 412, and the clothing 414. The content processing service may still identify these implicit relationships using natural language techniques, regular expression techniques, content parsing techniques, semantic analysis techniques, syntactic analysis techniques, or other forms of content analysis known in the art, as described above. While these relationships may not appear in the text and thus may not necessarily be replaced, they may still be used to aid in the selection of social graph objects and/or supplemental objects, as will be discussed below.

The content processing service also analyzes a source graph in this example, here, a user's social graph. For the following example, the content processing service identifies the following social graph objects and their attributes, among many others:

| Object | Name Attribute |
|--------|----------------|
| Person | Emily |
| Person | Laurel |
| Band | The Future Singers |
| Person | Paul |

The content processing service also identifies that the person object with the name attribute Emily has a birthday month attribute of June. The content processing service further identifies several relationships between these social graph objects in the social graph:

| First Object | Second Object | Relationship |
|--------------|---------------|--------------|
| Person (Emily) | Person (Laurel) | Sister |
| Person (Emily) | Person (Paul) | Uncle |
| Person (Emily) | Band (The Future Singers) | Favorite Band |

The content processing service may thus select replacements for the original objects, attributes, and relationships based on these identified social graph objects, attributes, and relationships. These replacements may be selected as described with respect to block 316 in FIG. 3 and, performed with respect to block 318 in FIG. 3.

Figure 5:
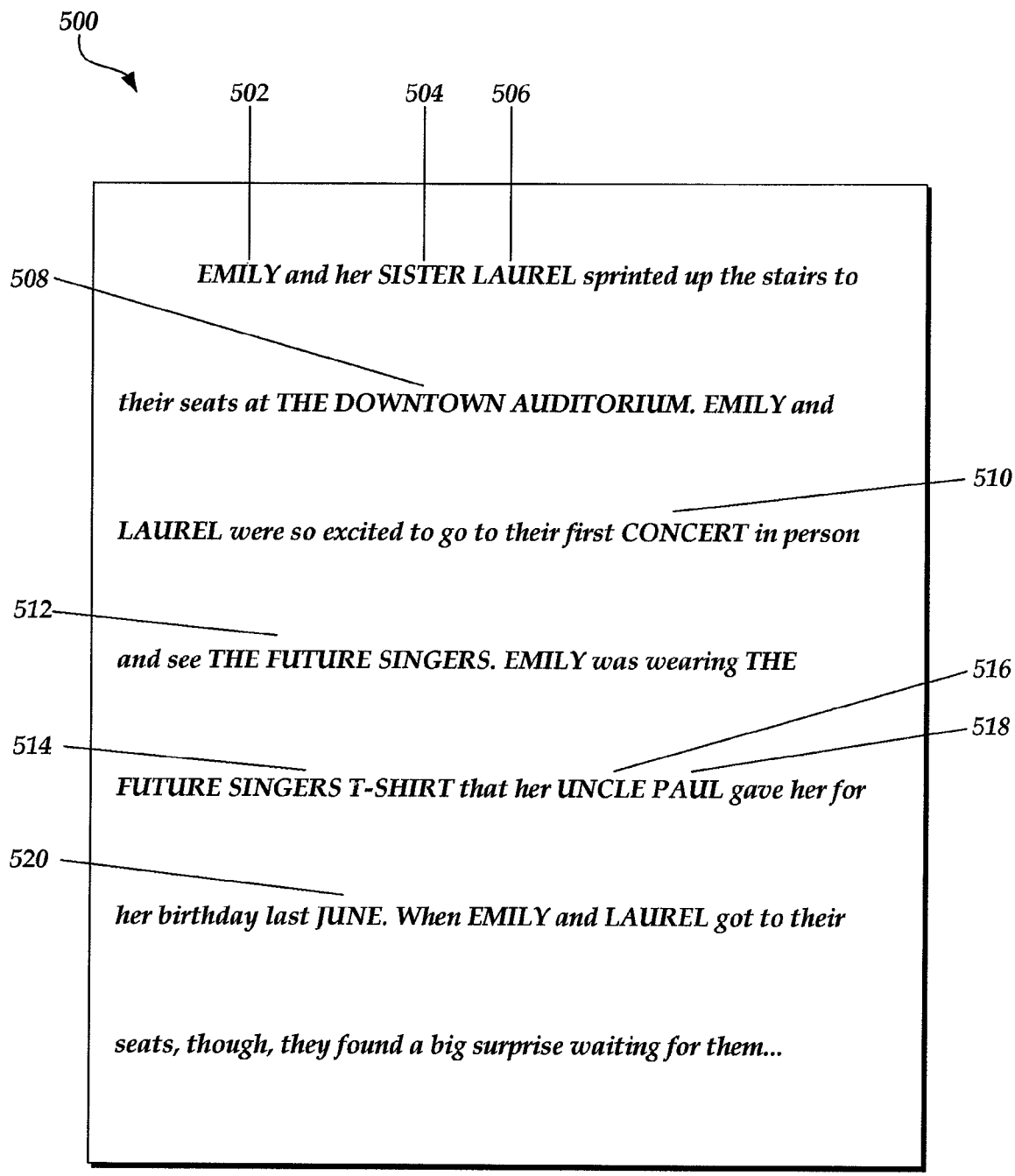
FIG. 5 is a pictorial diagram of an illustrative item of modified content.

To demonstrate these selections and replacements, FIG. 5 shows pictorial diagram of an illustrative item of modified content 500. Like the item of original content 400, the item of modified content 500 is an audiobook script in this example. For ease of reference, these objects and their name attributes are described in the following table:

| Ref. No. | Object | Social Graph Name Attribute |
|----------|--------|----------------------------|
| 502 | Person | Emily |
| 506 | Person | Laurel |
| 508 | Place | The Downtown Auditorium |
| 510 | Event | Concert |
| 512 | Organization | The Future Singers |
| 514 | Clothing | Future Singers T-Shirt |
| 518 | Person | Paul |

Object 502 also has a birthday month attribute 520 of June. For ease of reference, the relationships between the objects in this example item of modified content 500 are described in the following table:

| Ref. No. | 1st Object Ref. No. | 2nd Object Ref. No. | Relationship |
|----------|---------------------|----------------------|--------------|
| 504 | 502 (Person, Emily) | 506 (Person, Laurel) | Sister |
| 516 | 518 (Person, Paul) | 502 (Person, Emily) | Uncle |

In this example, the content processing service selects the person 402 Kevin in the item of original content 400 to be replaced with the person 502 Emily from the example social graph described above. The content processing service also replaces the birthday month attribute 420 January affiliated with the person 402 Kevin with the social graph birthday month attribute 520 June affiliated with the person 502 Emily. However, in this case, the content processing service does not identify any more identical relationships, meaning, for example, that Emily's social graph doesn't have a best friend in her social graph that might replace person 404 Will. Accordingly, the content processing service can use similar relationships in conjunction with supplemental objects to provide more modifications the item of original content 400.

Generally described, source graph objects may be selected based on relationships between each and between original objects. Several illustrations of these relationship-based selections are described herein. For example, two social graph objects may be selected based on the similarity of their relationship to the relationship of two original objects, even if the relationships are not identical. For example, friends may be considered to have a similar relationship to siblings, or an aunt or uncle may be considered to have a similar relationship with a niece or nephew as a godparent would have with his or her godchild. Accordingly, in the illustrated example, the content processing service selects the social graph object 506 named Laurel to replace the original object 406 named Will. This selection is made because the sister relationship 504 between Emily and Laurel may be considered to be similar to the best friend relationship 404 between Kevin and Will. Likewise, the content processing service selects the social graph object 518 named Paul to replace the original object 418 named Sue. This selection may be made because the uncle relationship 518 between Paul and Emily may be considered to be similar to the godmother relationship 518 between Sue and Kevin. Further, the content processing service selects the social graph object 512 named the Future Singers to replace the original object 512 named The Rhinos. This selection may be made because the favorite team relationship between Kevin and The Rhinos may be considered to be similar to the favorite band relationship between Emily and the Future Singers.

The similarity of relationships may also be used to select supplemental (or other source graph) objects, attributes, and relationships as needed. For example, the example social graph above does not contain social graph objects corresponding to the place 408, the event 410, or the clothing 414 in the item of original content 400. The example social graph also does not include a "venue" relationship between the place 408 and the event 410 or an "appropriate attire" relationship between the organization 412, event 410, and the clothing 414. Accordingly, the content processing service may access a supplemental graph including a plurality of supplemental objects, each including one or more supplemental attributes. Based on the social graph objects and attributes, one or more supplemental objects may be selected.

A supplemental object may be selected so that a social graph object and the selected supplemental object have a relationship similar or identical to the relationship between two original objects. Accordingly, the content processing service may examine the social graph object 512 named The Future Singers and select a supplemental object 508 named The Downtown Auditorium to replace the original place object 408 named The City Stadium. This selection is made because the Future Singers have a venue relationship with the Downtown Auditorium, much as the Rhinos have a venue relationship with the City Stadium in the item of original content 400.

In one embodiment, a selected supplemental object is used to guide the selection of a second supplemental object. The second supplemental object may be selected so that the two supplemental objects have a relationship similar or identical to the relationship between two original objects. Accordingly, the content processing service may examine the supplemental object 508 Downtown Auditorium and select a second supplemental object, an event object 510 corresponding to a concert. The selection is made because the Downtown Auditorium may have a hosting relationship with concerts, similar to how the City Stadium may have a hosting relationship with baseball game events 410 in the item of original content 400.

In other embodiments, a selected supplemental object and a selected social graph object are used to guide the selection of a second supplemental object. The second supplemental object may be selected so that the two supplemental objects and the social graph object collectively have a relationship similar to the relationship between three original objects. Accordingly, the content processing service may examine the supplemental object 510 named the concert and the social graph object 512 named The Future Singers and select a supplemental object 514 corresponding to a Future Singers T-shirt to replace the original object 414, a Rhinos jersey. The selection is made because the "appropriate attire" relationship between the concert, The Future Singers, and the Future Singers T-shirt would be identical to "appropriate attire" relationship between the baseball game, The Rhinos, and Rhinos jersey in the item of original content 400.

In embodiments, the content processing service may perform further modifications on the item of original content 400 to "finish" the item of modified content 500. Finishing the item of original content may include performing quality control, as discussed below with respect to FIG. 8. Finishing the item of original content may also include requesting modifications from a user of the content processing service, as discussed below with respect to FIG. 9.

Modifying Narration

Figure 6:
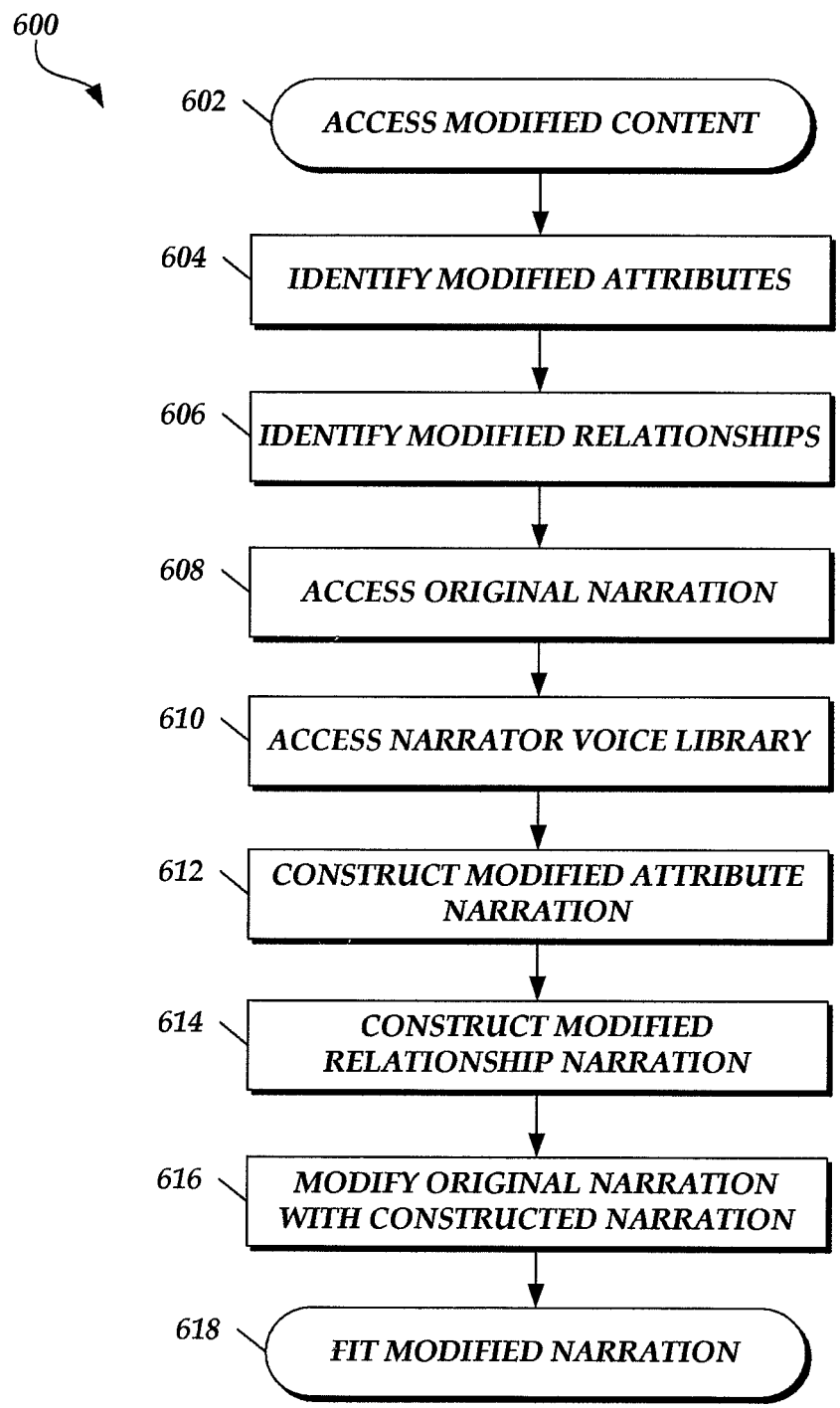
FIG. 6 is a flowchart depicting an illustrative process for generating modified narration for an item of modified content.

An example of the modification of an audiobook script was shown in FIG. 4 and FIG. 5. The narration of an item of original content may be modified as well. FIG. 6 is a flowchart depicting an illustrative process 600 for generating modified narration for an item of modified content, such as the item of modified content 500 illustrated in FIG. 5. In this example, words corresponding to original attributes and relationships in the item of original content 400 were replaced with words corresponding to social graph and supplemental attributes and relationships in the item of modified content 500. Advantageously, the narration may be updated so that the narrator speaks the words corresponding to the changed attributes and relationships. In other words, the narration changes to reflect the modified text in the item of modified content, as discussed above with respect to block 320 in FIG. 3. The generation of modified narration is discussed here in greater detail.

In block 602, the data access component 202 may access the item of modified content. In some embodiments, the item of modified content is accessed from the memory of a content processing server 110 as described with respect to FIG. 2. In other embodiments, the item of modified content is accessed from the content data store 112.

The item of modified content may be analyzed to identify modified attributes and modified relationships present therein. The extractor component 204, as described above with respect to FIG. 2, may identify modified attributes, as in block 604, and modified relationships, as in block 606. The same techniques used to identify attributes, and relationships in an item of original content may also be used to identify attributes, and relationships in an item of modified content.

The content processing service also accesses the original narration, as shown in block 608. In embodiments, the data access component 202 of a content processing server 110 accesses a narration data store 108, as shown in and as described with respect to FIG. 1 and FIG. 2.

In block 610, the content processing service accesses the narrator voice library. The narrator voice library, as discussed above with respect to FIG. 1, may include a set of audio clips spoken by a given narrator sufficient to allow an embodiment of the content processing service to construct a recitation including any word or phrase in the narrator's or character's voice. The narrator voice library may be stored on a narration data source 108, and accessed by the content processing server 110 through the data access component 202. As discussed above, the narrator voice library may include one or more audio clips spoken in the voice of a person from the individual's social graph or from a supplemental graph.

In some embodiments, the content processing service may construct recitations of the attributes (social graph attributes or supplemental attributes) that will replace one or more original attributes, as shown in block 612. The constructed recitation may be based on a selected set of audio clips using voice synthesis techniques known in the art. In some embodiments, the selected set of audio clips is spoken by the same narrator or character who speaks one or more original recitations in the original narration.

In some embodiments, the content processing service constructs recitations of the relationships (social graph attributes or supplemental attributes) that will replace one or more original relationships, as shown in block 614. The constructed recitation may be based on a selected set of audio clips using voice synthesis techniques known in the art. In some embodiments, the selected set of audio clips is spoken by the same narrator who speaks one or more original recitations in the original narration.

In block 616, the original narration is modified by the content processing service. The extractor component 204 identifies, in the original narration, any recitations of original attributes and relationships that should be replaced with social graph or supplemental objects or attributes. The replacer component 206 may then replace those recitations of original attributes and relationships with the recitations constructed in blocks 612 and 614. Using the modulation component 208, the original narration may be further modified in block 618 to "fit" the constructed recitations into modified narration using speech synthesis techniques known in the art. For example, a constructed recitation's tone, inflection, volume, and spectral composition could be compared to the tone, inflection, volume, and spectral composition of the original recitations immediately preceding and following the constructed recitation. Other ways to fit the constructed recitations into the modified narration are possible.

It will be appreciated by those skilled in the art that in some embodiments, recitations are not constructed or synthesized. For example, a selected person from an individual's social graph or from a supplemental graph may speak entire recitations to replace the recitations spoken in the voice of the narrator or character in the item of original content. These recitations may be stored as audio clips in a voice library as described above. In these embodiments, constructing or synthesizing a recitation may be unnecessary, though it may be desirable to "fit" the substitute recitations.

Finishing the Modified Content and/or Narration

Figure 7:
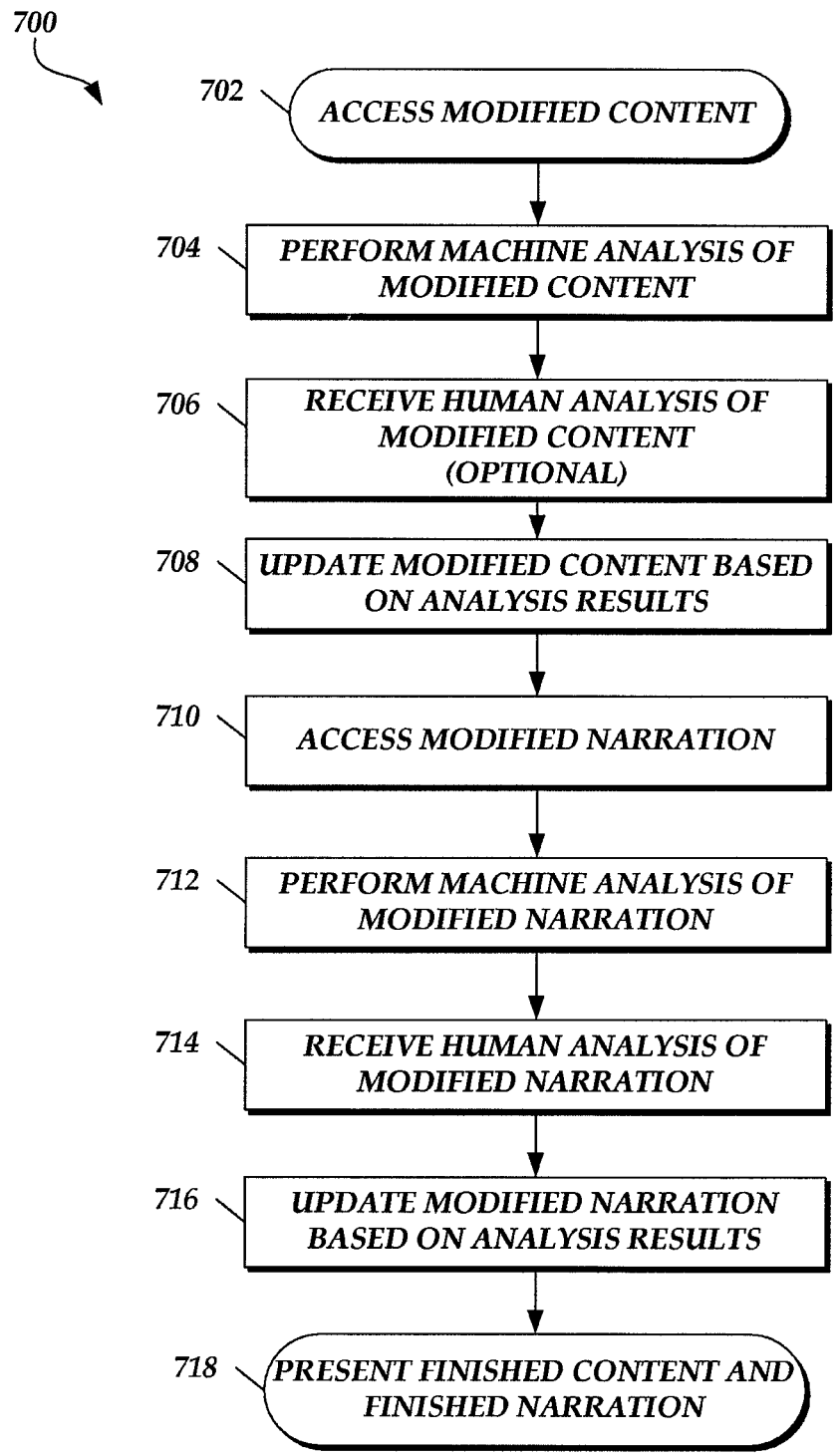
FIG. 7 is a flowchart depicting an illustrative finishing process for the item of modified content and for the modified narration.

Further modifications to an item of modified content may be desirable. For example, the content processing service may advantageously incorporate a quality control process to finish the item of modified content and the associated narration, as shown in FIG. 7. In block 702, the item of modified content may be accessed. In some embodiments, the item of modified content is accessed from memory on the content processing server 110 as shown in and as described with respect to FIG. 2. In other embodiments, the item of modified content is accessed from the content data store 112.

In block 704, the content processing service performs machine analysis on the item of modified content. In some embodiments, this machine analysis includes determining a coherence value for the item of modified content. In some embodiments, the coherence value is calculated by generating clusters for each object and attribute in the object of modified content using clustering techniques known in the art. The compactness of these clusters can be based on how frequently two attributes appear together in items of original content. For example, a cluster including a stagecoach, a revolver, and a cowboy may be very compact, as these objects and attributes frequently appear together in items of original content set in the Wild West. On the other hand, a cluster including a stagecoach, a laser gun, and a pirate may not be very compact, as the objects and attributes may rarely, if ever appear together in an item of original content. A compact cluster can contribute to a high coherence value, while a diffuse cluster can give rise to a low coherence value. In some embodiments, the coherence value of a cluster based on the modified content is compared to the coherence value of a cluster based on a supplemental graph for a theme or setting stored by the content processing service.

The coherence value of the item of modified content may optionally be determined in some embodiments by receiving input from a human through a human interaction task system, as in block 706. Generally described, human interaction task systems may be used to perform tasks or answer questions that are relatively easy for humans to carry out or answer, but relatively difficult for computers to carry out or answer. Human interaction task systems may include one or more human operators that perform these tasks. For example, a portion of an item of modified content may presented to a human user of the human interaction task system. The human user may then be asked to rate the coherence of the item of modified content on a scale, for example, from 1 to 10. A high coherence rating from the human user may contribute to a high coherence value for the item of modified content, and vice versa.

Based on the results of the analyses in block 704 and block 706, the content processing service may perform further updates to the modified content. In some embodiments, these further updates are performed if the coherence value of the modified content is below a satisfactory threshold value. As an example, say that only one original object's attributes have been replaced by a supplemental object's attributes in the item of modified content. The coherence value of the item of modified content formed by this replacement is unsatisfactorily low, according to the machine analysis performed in block 704 and/or the human analysis performed in block 706. In some embodiments, the content processing service replaces the attributes of a second original object with the attributes of a supplemental object. In other embodiments, the content processing service replaces the attributes of a second original object with the attributes of a second supplemental object. In still other embodiments, the content processing service undoes one or more replacements to restore, for example, an original attribute replaced by a supplemental attribute. Other further updates are possible. Embodiments of the content processing service may iterate these further updates, determine a coherence value after each further update, and then cease making further updates once the coherence value threshold has been met. Additionally, in some embodiments, if the coherence value of the modified content is below a satisfactory threshold value, the content processing service may solicit suggestions from human users of a human interaction task system on how to increase the coherence value of the modified content.

In block 710, the content processing service may access the modified narration affiliated with the item of modified content. The modified narration may be accessed, for example, from memory on the content processing server 110, as shown in and as described with respect to FIG. 2. In other embodiments, the item of modified content is accessed from the narration data store 108.

In block 712, the content processing service may perform machine analysis on the modified narration. In some embodiments, this machine analysis includes comparing constructed recitations in the modified narration to original recitations remaining in the modified narration. In some embodiments, using voice analysis techniques known in the art, a constructed, synthesized, or substituted recitation is compared to one or more original recitations to determine how well the constructed, synthesized, or substituted recitation fits with the original recitations. For example, the recitation's volume and spectral composition could be compared to the volume and spectral composition of the recitations immediately preceding and following the constructed recitation. Other aspects of the recitation may be compared to the surrounding recitations as well, for example, tone, pitch, prosody, and accent.

In block 714, the content processing service may receive human analysis of the modified narration. This analysis is generated by human users of a human interaction task system. In some embodiments, the human user of the human interaction task system is asked for one or more suggestions on how to improve the modified narration. For example, the human interaction task system may prompt the human user to suggest changes to the volume, tone, inflection, or speaker of one or more of the constructed recitations in the modified narration. If the human user of the human interaction task system suggests changing the speaker of a constructed recitation, the content processing service may choose or generate an entirely new recitation from a different set of audio units.

In block 716, the content processing service may update the modified narration based on the analysis results obtained in block 712 and block 714. These updates can be performed by the modulation component 208 of a content processing server 110 as shown in and as described with respect to FIG. 2. The modulation component 208 may, for example, change the volume of a recitation in the modified narration; change the tone of a recitation in the modified narration; change the inflection of a recitation in the modified narration; change the accent or prosody of the speaker of a recitation in the modified narration; or change the speaker of a recitation in the modified narration by constructing or synthesizing one or more entirely new recitations from a different set of audio clips.

Finally, in block 718, the finished item of modified content and/or the finished narration may be presented. In embodiments, the finished item of modified content and finished narration is transmitted from the content processing server 110 through the data access component 202 over the electronic network 104 to the client device 102, as shown in and as described with respect to FIG. 1 and FIG. 2. A user interface may be provided by the user interface component 212 to present the finished item of modified content and the finished narration on the client device 102, as shown in and as described with respect to FIG. 1 and FIG. 2.

Figure 8:
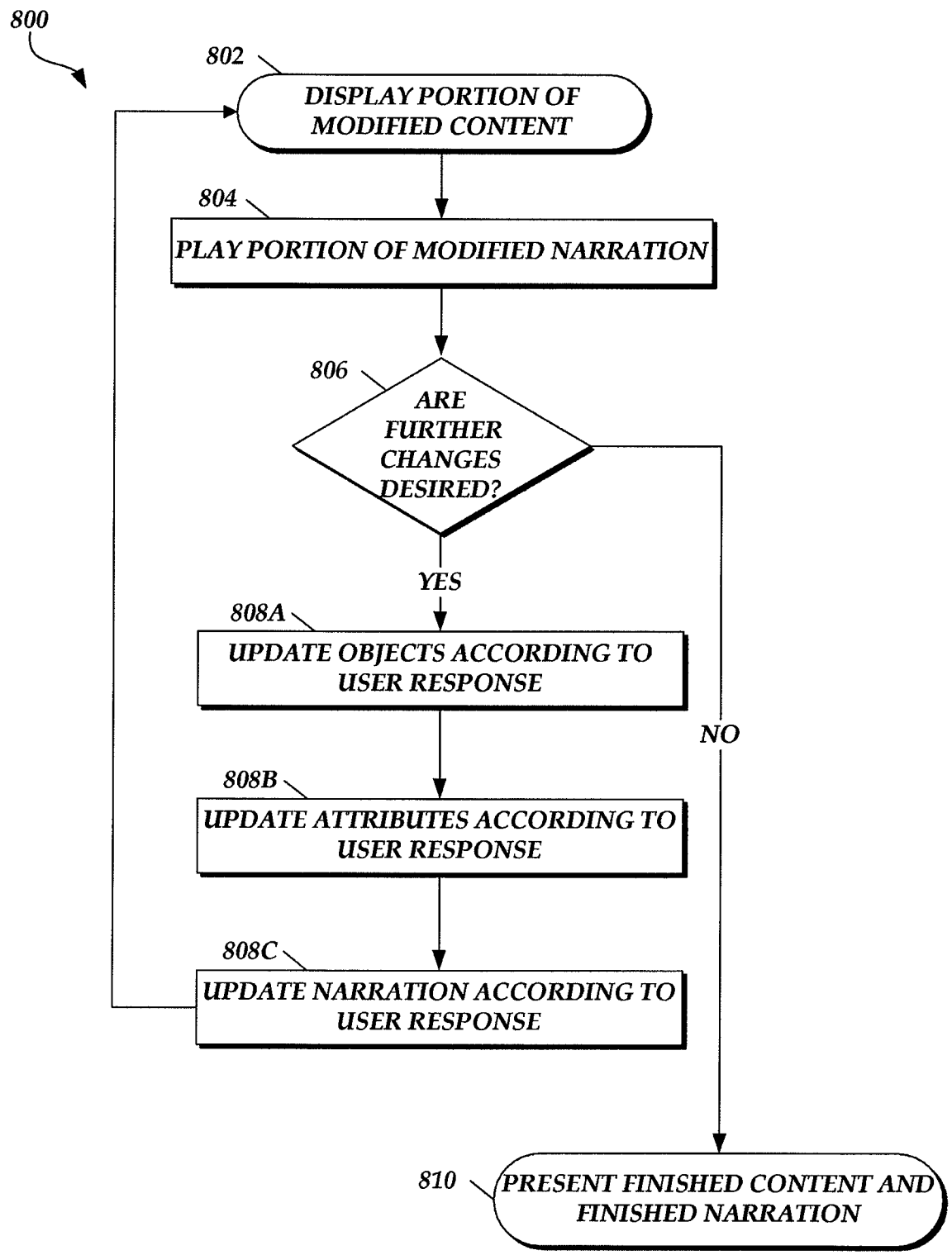
FIG. 8 is a flowchart depicting an illustrative process in which portions of the item of modified content and the modified narration are presented to a user for finishing.

As discussed above, in some embodiments of the content processing service, a user of the content processing service, such as a potential purchaser or consumer of the item of modified content and modified narration, may participate in the finishing process. The user may participate in the finishing process instead of or in conjunction with the content processing service's finishing process described above. Accordingly, FIG. 8 depicts a flowchart that illustrates an example of user participation in the finishing process. The user interface component 212 may direct the other components of the content processing server 110 to perform any changes request by the user during the illustrated process flow 800.

In block 802, a portion of the modified content is displayed to the user. In some embodiments, the content processing service may cause the portion of the modified content to be displayed on a user's client device 102, as shown in and as described with respect to FIG. 1. In block 804, a portion of the modified narration may be played as well. In some embodiments, the content processing service may cause the portion of the modified narration to be played on a user's client device 102, as shown in and as described with respect to FIG. 1.

In block 806, the content processing service may ask the user if any further changes are desired. If the content processing service receives an indication that further changes are desired, the content processing service may ask the user to specify their desired changes. The content processing service may also store the changes specified by the user to a user profile. Thus, the content processing service may learn from the user's choices so that the user does not have to specify changes the next time he or she uses the content processing service.

In some embodiments, the content processing service may receive a response from the user indicating that he or she wishes to change the selection of objects used to form an item of modified content. For example, the user may wish to have a social graph object map to an original object other than the one selected by the content processing service. The user's best friend, for instance, may replace the villain in an item of modified content. The user may instead wish for the best friend to play a sidekick to the main character. Thus, in block 808A, the content processing service may update the selection of social graph objects according to the user's wishes so that, in this example, the social graph object corresponding to the user's best friend is mapped to the original object corresponding to the sidekick. Accordingly, the user's best friend's attributes would not replace the villain's attributes, but would instead replace the sidekick's attributes.

In some embodiments, the content processing service may receive a response from the user indicating that he or she wishes to change the selection of objects used to form an item of modified content. For example, the user may wish to have an original attribute replaced with a different social graph attribute than the one selected by the content processing service. For example, a main character may have blonde hair. The user may have brown hair. The content processing service may have replaced some of the attributes of the main character with some of the attributes of the user, such as replacing the main character's name with the user's name. But the content processing service may not have replaced the main character's blonde hair color attribute with the user's brown hair color attribute. Thus, in block 808B, the content processing service may update the selection of social graph attributes according to the user's wishes, so that, in this example the user's character has brown hair.

In some embodiments, the content processing service may update the modified narration based on the responses of the user in block 808C. The user may specify, for instance, that the tone, volume, inflection, or speaker of one or more recitations in the modified narration should be changed. Changes specified by the user in block 808A and block 808B may require the construction of new recitations as well. The content processing service may update the modified narration based on the requests of the user as well as on any changes that may be necessitated from changes made in block 808A and block 808B.

After any specified changes in block 808A, block 808B, and block 808C are made, the flow process returns to block 802 and proceeds to block 804 and block 806. If the user does not request any changes to the modified content or modified narration in block 806, embodiments of the content processing service 810 may present the finished content and finished narration to the user. In some embodiments, the finished content and finished narration are presented on the user's client device 102 as shown in and as described with respect to FIG. 1. The finished content and finished narration may also be partially or wholly frozen by the content processing service or by the user through user's client device 102, as described above.

Figure 9:
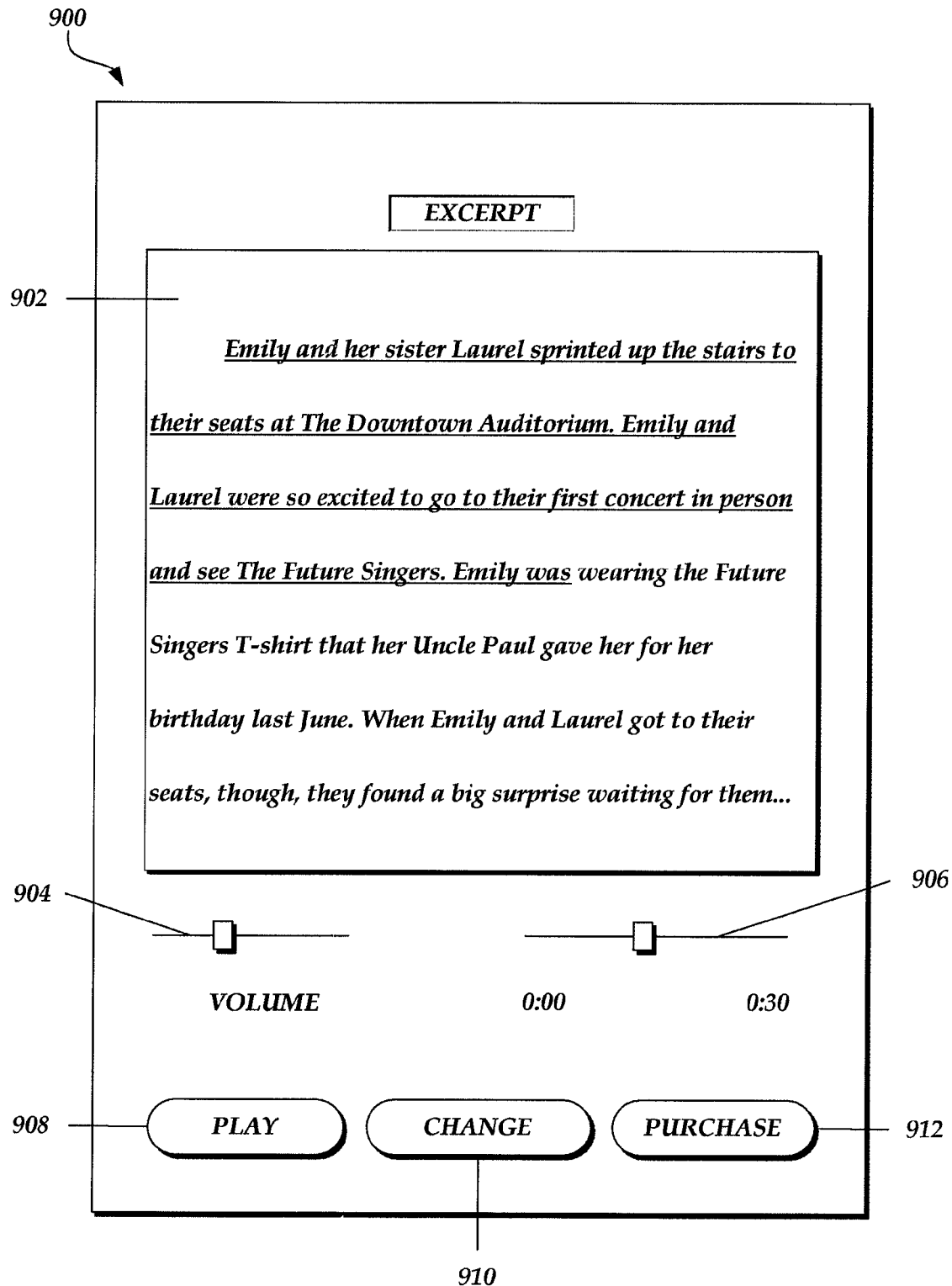
FIG. 9 is an example user interface for presenting portions of the modified content and narration to the user.

FIG. 9 depicts an embodiment of a user interface 900 that may be presented to a user of the content processing service. The user interface 900 may display a text portion of an item of modified content 902. The user interface 900 may also be provided with a volume slider 904, a progress bar 906, a play button 908, a change button 910, and a purchase button 912. Other interactive elements, such as a pause button or a rewind button, may be added to the user interface 900 as desired. It should be appreciated that the user interface 900 may display other portions of an item of modified content as well, such as video content for items of modified content that may include a video portion.

In some embodiments, the user is directed to press the play button 908 to hear a portion of the modified narration. In some embodiments, the text portion of the item of modified content 902 is progressively underlined so that each word is underlined when it is spoken in the excerpt of the narration. In other embodiments, the text portion of the item of modified content 902 is progressively bolded so that each word is bolded when it is spoken in the excerpt of the modified narration. Still other ways to help the user align the narration with the text are possible, such as a "bouncing ball" that skips over each word as it is spoken in the narration.

In some embodiments, the user may desire changes to the item of modified content after reading the text portion of the item of modified content 902 or after hearing the excerpt of the modified narration. The user may indicate that further changes are desired by pressing the change button 910. In some embodiments, the user may then be directed to another user interface that requests that the user specify any desired changes, as described above with respect to block 806, block 808A, block 808B, and block 808C in FIG. 8.

If the user wishes to purchase the entire item of modified content and its modified narration, the user may press the purchase button 912. In embodiments, once the purchase button 912 is pressed, the content processing system transmits the entire item of modified content and any modified narration over the network 104 to the user's client device 102, as shown in and as described with respect to FIG. 1. In other embodiments, the content processing system asks the user whether the purchase is for the user or as a gift to a designated recipient. If the purchase is a gift, the content processing system may transmit the entire item of modified content and any modified narration over the network 104 to the designated recipient's client device 102, as shown in and as described with respect to FIG. 1. Those skilled in the art will appreciate that in some embodiments, the content processing service may offer an item of modified content to individuals other than the user who requested the content processing service to form the item of modified content.

In some embodiments, the content processing service may, before transmitting a purchased item of modified content or modified narration to a client device, apply digital rights management (DRM) to a purchased item of modified content and modified narration. The DRM may, in embodiments, prevent the purchased item of modified content or modified narration from being used on a client device other than the purchaser's client device. Other digital rights management schemes, known in the art, may be used with embodiments of the content processing service, and are not described in further detail here.

All of the methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A computer-implemented method comprising:
    under control of one or more computing devices configured with specific computer executable instructions,
        identifying a plurality of original objects in an item of original content;
        selecting an original object comprising at least one original attribute from the plurality of original objects;
        selecting, from a source other than the item of original content, a replacement object comprising at least one attribute;
        replacing, in the item of original content, at least one original attribute of the selected original object with at least one attribute of the selected replacement object to form an item of modified content;
        determining a coherence value for the item of modified content, wherein the coherence value is based at least in part on a number of times that two or more words included in the item of modified content appear together in a plurality of items of original content; and
        based at least in part on a determination that the coherence value does not satisfy a threshold value, replacing, in the item of modified content, the at least one attribute of the selected replacement object with at least one of: a different attribute of the selected replacement object or an attribute of a different replacement object.

2. The computer-implemented method of claim 1 further comprising identifying, in the item of original content, a relationship between the selected original object and a second original object.

3. The computer-implemented method of claim 2, wherein the replacement object is selected based at least in part on a determination that a relationship between the selected replacement object and a second replacement object is identical to the relationship between the selected original object and the second original object.

4. The computer-implemented method of claim 2, wherein a relationship between the selected replacement object and a second replacement object is different from the relationship between the selected original object and the second original object.

5. The computer-implemented method of claim 4 further comprising replacing, in the item of original content, the relationship between the selected original object and the second original object with the relationship between the selected replacement object and the second replacement object.

6. The computer-implemented method of claim 1, wherein the source other than the item of original content comprises a source graph.

7. The computer-implemented method of claim 6, wherein the source graph comprises a social graph.

8. The computer-implemented method of claim 7, wherein the social graph is maintained by a social networking service and indicates a structure of one or more relationships between a user and each of a plurality of social graph objects.

9. The computer-implemented method of claim 8, wherein the replacement object comprises a social graph object selected from the social graph, wherein the replacement object is selected from the social graph based at least in part on a relationship between the selected social graph object and at least a second social graph object from the social graph.

10. A computer-implemented method comprising:
    under control of one or more computing devices configured with specific computer-executable instructions,
        selecting an original object from an item of original content, wherein the original object comprises at least one original attribute;
        selecting a replacement object from a source other than the item of original content;
        replacing, in the item of original content, at least one original attribute of the selected original object with at least one attribute of the replacement object to form an item of modified content;
        determining a coherence value for the item of modified content, wherein the coherence value is based at least in part on a number of times that two or more words included in the item of modified content appear together in a plurality of items of original content; and
        based at least in part on a determination that the coherence value does not satisfy a threshold value, replacing, in the item of modified content, the at least one attribute of the selected replacement object with at least one of: a different attribute of the selected replacement object or an attribute of a different replacement object.

11. The computer-implemented method of claim 10, wherein the item of original content comprises text.

12. The computer-implemented method of claim 10, wherein the item of original content comprises a computer game.

13. The computer-implemented method of claim 10, wherein the original object is selected based at least partially on user input.

14. The computer-implemented method of claim 10, wherein the replacement object is selected based at least partially on user input.

15. The computer-implemented method of Claim 10 further comprising:
based at least in part on the determination that the coherence value does not satisfy the threshold value, replacing, in the item of modified content, at least one original attribute of a second original object selected from the item of original content with at least one attribute of a second object selected from the source other than the item of original content.

16. The computer-implemented method of claim 10 further comprising:
based at least in part on the determination that the coherence value does not satisfy the threshold value, restoring, in the item of modified content, the replaced at least one original attribute of the selected original object; and
replacing, in the item of modified content, at least one original attribute of a second original object selected from the item of original content with at least one attribute of the replacement object.

17. The computer-implemented method of claim 10 further comprising:
identifying at least one updated attribute of the replacement object; and
replacing, in the item of modified content, the at least one attribute of the replacement object with at least one updated attribute.

18. The computer-implemented method of claim 10, wherein at least one of the two or more words is the at least one attribute of the selected replacement object.

19. The computer-implemented method of claim 10, wherein the determination that the coherence value does not satisfy the threshold value comprises a determination that the coherence value is below the threshold value.

20. The computer-implemented method of claim 10 further comprising presenting at least a portion of the item of modified content.

21. The computer-implemented method of claim 20, wherein the at least a portion of the item of modified content presented comprises at least one of text, audio, an image, or video.

22. The computer-implemented method of claim 20 further comprising receiving one or more indications of further changes to the item of modified content.

23. A non-transitory, computer-readable medium storing computer executable instructions that, when executed by one or more computing devices, configure the one or more computing devices to perform operations comprising:
from an item of original content comprising a plurality of original objects, selecting an original object, the selected original object comprising original attributes;
selecting a replacement object from a source other than the item of original content;
replacing, in the item of original content, the original attributes of the selected original object with attributes of the replacement object to form an item of modified content;
determining a coherence value for the item of modified content, wherein the coherence value is based at least in part on a number of times that two or more words included in the item of modified content appear together in a plurality of items of original content; and
based at least in part on a determination that the coherence value does not satisfy a threshold value, replacing, in the item of modified content, at least one attribute of the selected replacement object with at least one of: a different attribute of the selected replacement object or an attribute of a different replacement object.

24. The non-transitory, computer-readable medium of claim 23, wherein the item of original content comprises at least one of an electronic book or a computer game.

25. The non-transitory, computer-readable medium of claim 23, wherein the operations further comprise obtaining at least one user profile.

26. The non-transitory, computer-readable medium of claim 25, wherein the selection of the replacement object is based at least partially on the obtained at least one user profile.

27. The non-transitory, computer-readable medium of claim 23, wherein the operations further comprise obtaining at least one rights-holder profile affiliated with the item of original content.

28. The non-transitory, computer-readable medium of claim 27, wherein the selection of the original object from the plurality of original objects is based at least partially on the obtained at least one rights-holder profile.

29. The non-transitory, computer-readable medium of claim 27, wherein selecting the replacement object comprises determining that the selected replacement object is a permissible replacement object in the item of original content based at least in part on the at least one rights-holder profile.

30. The non-transitory, computer-readable medium of claim 23, wherein determining the coherence value for the item of modified content comprises generating clusters for a plurality of objects and attributes in the item of modified content.

31. The non-transitory, computer-readable medium of claim 30, wherein the coherence value is based at least in part on the compactness of at least one of the generated clusters.

32. A system for processing content, the system comprising:
an electronic content data store configured to store a plurality of items of original content, each of the plurality of items of original content comprising a plurality of original objects, each original object comprising at least one original attribute; and
a computing device, comprising one or more physical processors, that is in communication with the electronic content data store and is configured to at least:
access an item of original content from the electronic content data store;
replace, in the item of original content, at least one original attribute of an original object with at least one attribute of a replacement object to form an item of modified content, wherein the replacement object is selected from a source other than the item of original content;
determine a coherence value for the item of modified content, wherein the coherence value is based at least in part on a number of times that two or more words included in the item of modified content appear together in the plurality of items of original content; and
based at least in part on a determination that the coherence value does not satisfy a threshold value, replace, in the item of modified content, the at least one attribute of the replacement object with at least one of: a different attribute of the replacement object or an attribute of a different replacement object.

33. The system for processing content of claim 32, wherein the computing device is further configured to at least:
present at least a portion of the item of modified content; and receive, a desired further modification to the item of modified content.

\* \* \* \* \*